(12) United States Patent
Betz et al.

(10) Patent No.: US 12,429,367 B1
(45) Date of Patent: Sep. 30, 2025

(54) FILL LEVEL SENSING DEVICES AND ADDITIVE MANUFACTURING APPARATUSES INCLUDING SAME

(71) Applicant: Concept Laser GmbH, Lichtenfels (DE)

(72) Inventors: Florian Betz, Lichtenfels (DE); Olaf Jäger, Lichtenfels (DE)

(73) Assignee: Concept Laser, GmbH, Lichtenfels (DE)

( * ) Notice: Subject to any disclaimer, the term of this patent is extended or adjusted under 35 U.S.C. 154(b) by 0 days.

(21) Appl. No.: 18/609,427

(22) Filed: Mar. 19, 2024

(51) Int. Cl.
*G01F 23/18* (2006.01)
*B07B 13/18* (2006.01)
*B33Y 40/00* (2020.01)

(52) U.S. Cl.
CPC .............. *G01F 23/18* (2013.01); *B07B 13/18* (2013.01); *B33Y 40/00* (2014.12)

(58) Field of Classification Search
CPC ......... G01F 23/18; B33Y 40/00; B33Y 50/02; B07B 13/18; B65G 53/66
USPC .............................................................. 209/2
See application file for complete search history.

(56) References Cited

U.S. PATENT DOCUMENTS

| | | | |
|---|---|---|---|
| 4,112,738 A * | 9/1978 | Turner | G01F 17/00 73/32 R |
| 9,512,544 B2 | 12/2016 | Heikkila | |
| 11,052,649 B2 | 7/2021 | Saito et al. | |
| 11,141,918 B2 | 10/2021 | Mamrak et al. | |
| 11,565,325 B2 | 1/2023 | Paternoster et al. | |
| 2022/0288686 A1 | 9/2022 | Heikkila | |
| 2023/0048362 A1 | 2/2023 | Liu et al. | |
| 2023/0054179 A1 | 2/2023 | Rementeria Fernandez et al. | |
| 2023/0058595 A1 | 2/2023 | Veron et al. | |
| 2023/0079987 A1 * | 3/2023 | Herding | B01J 20/28004 95/279 |

FOREIGN PATENT DOCUMENTS

| | | |
|---|---|---|
| CN | 111665166 B | 6/2021 |
| DE | 10041051 A1 | 3/2002 |
| EP | 2427740 B1 | 6/2022 |
| WO | WO-2020196000 A1 * | 10/2020 ........... B29B 13/065 |
| WO | 2023006277 A1 | 2/2023 |

OTHER PUBLICATIONS

Hoyama; Katsuaki, "Granular Material Processing Method and Granular Material Processing Device" (English Translation), Oct. 1, 2020, worldwide.espacenet.com (Year: 2020).*
European Patent Office, Extending Search Report issued in EP 25159057.6 dated Jul. 30, 2025 (10 pages).

* cited by examiner

*Primary Examiner* — Michael McCullough
*Assistant Examiner* — Molly K Devine
(74) *Attorney, Agent, or Firm* — Wood Herron & Evans LLP

(57) ABSTRACT

Disclosed herein are particulate separation systems including a filter device that separates particulates from a particulate-laden stream generated by an additive manufacturing apparatus. A collection container is also included which is fluidly connected to the filter device and receives the particulates separated from the particulate-laden stream. A fill level sensor is further included which is fluidly connected to the collection container and detects a pressure change from displacement of an inert gas by the particulates received in the collection container.

20 Claims, 4 Drawing Sheets

FILL LEVEL SENSING DEVICES AND ADDITIVE MANUFACTURING APPARATUSES INCLUDING SAME

TECHNICAL FIELD

The present specification generally relates to additive manufacturing apparatuses and, more specifically, to systems and methods for determining a powder or particulate fill level in a collection container, or any other closed volume, of an additive manufacturing apparatus.

BACKGROUND

Additive manufacturing apparatuses may be utilized to build an object from a build material, such as organic or inorganic powders, in a layer-wise manner. In some applications, additive manufacturing apparatuses use particulate separation systems that separate particulates from a particulate-laden stream generated during the additive manufacturing processes. These separated particulates are collected in a collection container for subsequent disposal or recycling within the additive manufacturing processes. It is often desirable to determine the amount of particulate matter collected in the collection container so that the collection container can be emptied and replaced at the appropriate time. Moreover, additive manufacturing apparatuses may generally include additional collection container where it is desirable to determine the amount of material in the collection container as the material is added to or removed from the collection container during the build process of the object.

However, existing measurement techniques, such as weighing by scales or using optical or contact sensors, introduce additional components into the additive manufacturing system and must be cleaned often to ensure proper performance. Weighing with scales must take into account the weight of the collection container and the influence of the components connected to the collection container. Optical sensors can only perform their measurement with respect to a limited field of view.

Accordingly, a need exists for improved measurement techniques for the fill level of collection containers used during additive manufacturing processes.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
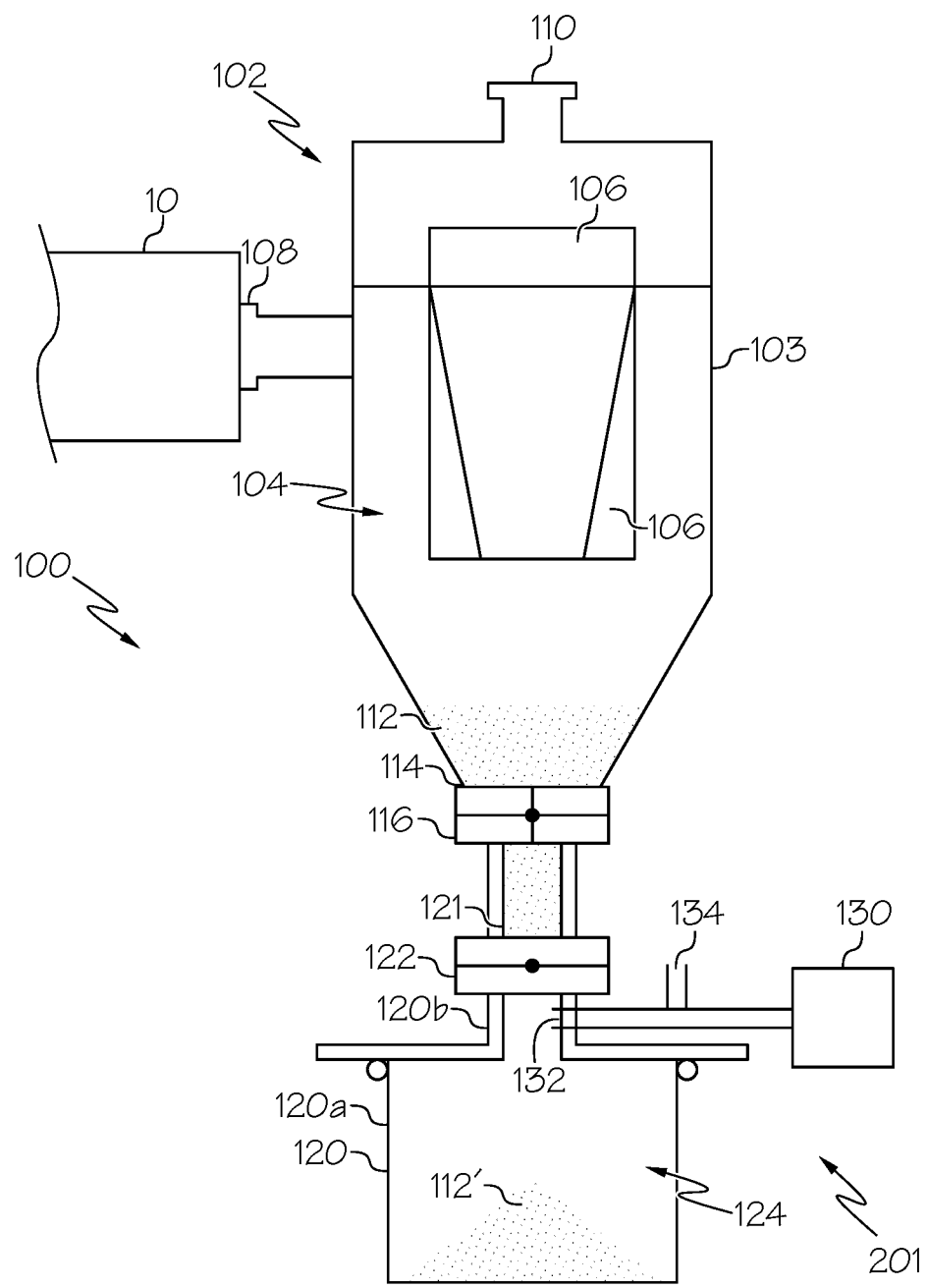
FIG. 1 schematically depicts a side view of a particulate separation system including a fill level sensor, according to one or more embodiments shown and described herein.

Embodiments described herein are directed to an additive manufacturing apparatus which includes a fluidly connected collection container and fill level sensor. The fill level sensor utilizes the ideal gas law to calculate the powder or particulate volume in the collection container, which has a known volume, when filled with a known amount of gas by measuring the pressure change and gas temperature. In this regard, a fill level percentage can be determined based on the calculated volume, and the fill level percentage can inform a decision to empty, replace, and/or refill the collection container further powder/particulate matter can be collected/distributed. Moreover, it should be understood that while the present disclosure may describe fill level sensing with respect to a collection container for particulate collection, the fill level sensing described herein may also be applicable to any other collection container or receptacle utilized by the additive manufacturing apparatus.

Additive manufacturing apparatuses utilize a number of different collection containers or receptacles which experience varying fill levels as the additive manufacturing process progresses. Any of these collection containers may be suitable for use with the exemplary fill level sensors described herein. For example, it may be desirable to determine the amount (e.g., volume) of build material (e.g., powder) in a build receptacle, where a build platform is retracted after each layer of material is deposited on the build material located on the build platform. As another example, it may be desirable to determine the amount (e.g., volume) of build material in a supply receptacle, where a supply platform is raised after a layer of build material is distributed from the supply platform. Moreover, it may be desirable to determine the volume of the printed part in the build receptacle.

Thus, in accordance with the embodiments described herein, the fill level sensor can determine a fill level percentage of the collection container in a contactless manner. This is important because contamination with respect to reactive soot can be avoided. Moreover, without contact, less cleaning of the measuring equipment may be required compared to measuring equipment that comes into contact with the material to be measured. Moreover, the fill level sensor of the present disclosure can determine the fill level percentage independent of the type of material being collected. In addition, the fill level sensor described herein is readily implemented in existing additive manufacturing apparatuses as many of the control mechanisms (e.g., pressure and volume flow gauges) are already available. Whenever possible, the same reference numerals will be used throughout the drawings to refer to the same or like parts.

Directional terms as used herein—for example up, down, right, left, front, back, top, bottom, upper, lower,—are made only with reference to the figures as drawn and are not intended to imply absolute orientation unless otherwise expressly stated. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The terms "coupled," "fixed," "connected," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Referring now to FIG. 1, a powder or particulate separation system 100 for an additive manufacturing apparatus 10 is illustrated according to one or more embodiments described herein. As used herein, the terms "additive manufacturing" or "additive manufacturing apparatus(es)" refer to manufacturing or build processes in which successive layers of material are deposited on top of each other to build-up, layer-by-layer, a three-dimensional component or object. The successive layers are melted or fused together to form a monolithic or integral component. In some embodiments, the manufacturing apparatus uses a powder bed fusion (PBF) technique, such as direct metal laser melting (DMLM) or directed metal laser sintering (DMLS). Furthermore, in alternative embodiments, the additive manufacturing apparatus 10 may use any other suitable additive manufacturing techniques or processes.

In the embodiment illustrated in FIG. 1, the particulate separation system 100 is fluidly connected to a process chamber of the additive manufacturing apparatus 10 to receive a particulate-laden stream from the process chamber, and the particulate separation system 100 separates at least some particulates out of the particulate-laden stream to produce a reduced-particulate stream. As referred to herein, the particulate-laden stream refers to unused build material, such as powder, received from the additive manufacturing apparatus 10. As described herein, particulate 112' is removed from the particulate-laden stream to result in the reduced-particulate stream. Accordingly, the particulates 112' may be recycled for possible reuse while the reduced-particulate stream is removed from the filter device 102. Additionally, separation of the particulate-laden stream removes harmful particulate collected within the process chamber of the additive manufacturing apparatus 10 such as, for example, explosive soot. Accordingly, the explosive soot is removed from the particulates 112' that are to be recycled and reused.

More particularly, a cyclonic separator or filter device 102 of the particulate separation system 100 performs the separation of particulates from the particulate-laden stream. The particulate separation system 100 generally further includes a collection container 120 for powder or particulate collection that is fluidly connected to the filter device 102. In embodiments, the collection container 120 includes a body 120a and a neck 120b provided at an upper surface of the body 120a. The neck 120b has a reduced diameter relative to the body 120a. However, it should be appreciated that the collection container 120 may have any suitable geometry and be formed from any number of parts other than that depicted herein. For example, the collection container 120 may have a constant diameter from top to bottom and be formed of a one-piece, monolithic structure.

A fill level sensor 130 is fluidly connected to the collection container 120. In embodiments, the fill level sensor 130 and the collection container 120 may form a standalone apparatus 201 separate from the filter device 102. The particulates separated from the particulate-laden stream by the filter device 102 are eventually collected in the collection container 120 that is positioned below the filter device 102.

In the embodiment of FIG. 1, the fill level sensor 130, as described in further detail below, is generally adapted to determine, in a contactless manner, the fill level (e.g., volume) of the particulates separated from the particulate-laden stream that have collected in a container with a known volume (e.g., collection container 120). By determining the fill level of particulates in embodiments where fill level sensing is performed in the particulate separation system 100, the decision to empty and replace the collection container 120, or alternatively select a different, empty container for connection to the filter device 102 can be made. It is contemplated that the particulate separation system 100 can include any number of filter devices 102 and a corresponding number of collection containers 120 and fill level sensors 130, depending on the particular embodiment.

In other embodiments, the fill level sensor 130 is generally adapted to determine, in a contactless manner, the fill level of another material, such as a build material, in a process chamber of the additive manufacturing apparatus 10, such as a build receptacle or supply receptacle, for example. By determining the fill level of a build material in embodiments where fill level sensing is performed in the process chamber of the additive manufacturing apparatus 10, for example, information as to the progress of the additive manufacturing process can be obtained (e.g., the build volume in the build receptacle is at 50%, for example, or the fill level of build material in the supply receptacle is at 50%, for example).

As shown in FIG. 1, each filter device 102 generally includes a filter housing 103 that defines a filter interior 104. At least a portion of the filter housing 103 may generally be configured to have a tapered, converging shape which accelerates the circulation flow of the incoming, particulate-laden stream to enhance the separation of particulates. One or more filters 106 are supported by the filter housing 103 within the filter interior 104 to perform particulate separation from the particulate-laden stream and produce the reduced-particulate stream. The particulate-laden stream enters the filter device 102 through one or more housing inlets 108 and the reduced-particulate stream exits the filter device through one or more housing outlets 110. The one or more housing inlets 108 may be oriented tangential to a peripheral wall of the filter housing 103 to aid in inducing a spiral or helical path to the particulate-laden stream.

Particulates suspended in the particulate-laden stream are cast radially outward toward the peripheral wall of the filter housing 103. The particulates 112 separated from the particulate-laden stream are not able to pass through the one or more filters 106 nor exit the housing outlet 110 and initially fall to a bottom of the filter housing 103 adjacent to a housing particulate outlet 114. A filter device valve 116 controls the flow of particulates 112 between the housing particulate outlet 114 of the filter housing 103 and a container particulate inlet 121 of the collection container 120. A container valve 122 is provided at the neck 120b of the collection container 120 and controls the flow of particulates between the container particulate inlet 121 of the collection container 120 and a container interior 124 of the collection container 120. Collected particulates 112' fill the container interior 124 when valves 116 and 122 are open. The collection container 120 further generally includes a container particulate outlet and associated valve provided at a bottom of the collection container 120, or any other suitable location of the collection container 120, for emptying collected particulates 112' from the container interior 124. The collection container 120 can be removed from the filter housing 103 in any suitable manner such as, for example, using a screw or plug-in connector which may be included as part of valves 116 and 122.

The fill level sensor 130 is fluidly connected to the collection container 120 at an inlet connection 132 that is generally disposed below the container valve 122. As shown in FIG. 1, the inlet connection 132 extends through the neck 120b of the collection container 120. However, it is contemplated that the inlet connection 132 of the fill level sensor 130 be fluidly connected to the collection container 120 at another location, depending on the particular embodiment. For example, the inlet connection 132 may extend through the body 120a of the collection container 120. As shown in FIG. 1, the fill level sensor 130 generally includes an inert gas inlet 134 for delivering an inert gas to the interior 124 of the collection container 120, as described in more detail herein. In embodiments, the inert gases may include nitrogen or argon.

Figure 2:
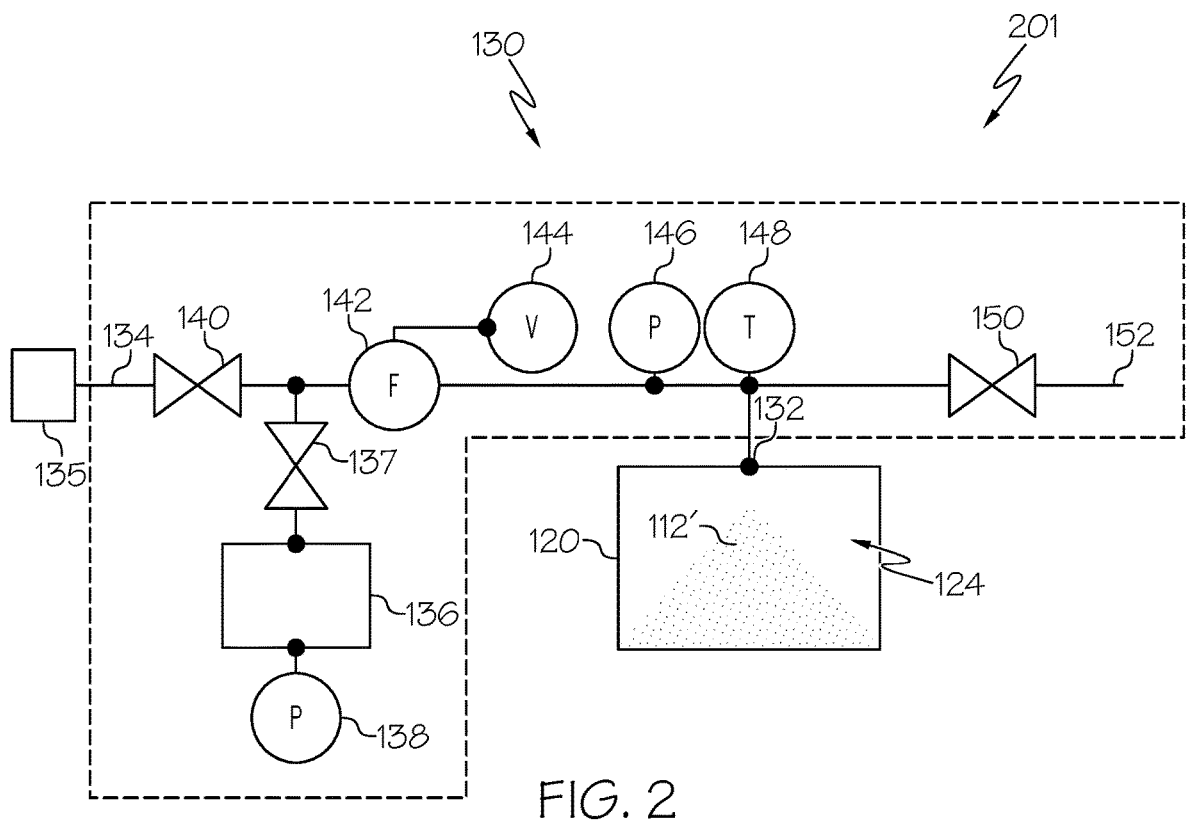
FIG. 2 schematically depicts the fill level sensor of FIG. 1, according to one or more embodiments shown and described herein.

Referring now to FIG. 2, additional details of an exemplary fill level sensor 130 are shown in accordance with embodiments described herein. In some embodiments, the inert gas inlet 134 delivers inert gas to a reference chamber 136. The reference chamber 136 includes a pressure transducer or sensor 138 fluidly connected thereto for measuring the pressure within the reference chamber 136. The flow of the inert gas between the reference chamber 136 and the container interior 124 is regulated by an inlet valve 140. In addition, a reference chamber valve 137 is included to regulate the flow of inert gas between the inert gas inlet 134 and the reference chamber 136.

Figure 3:
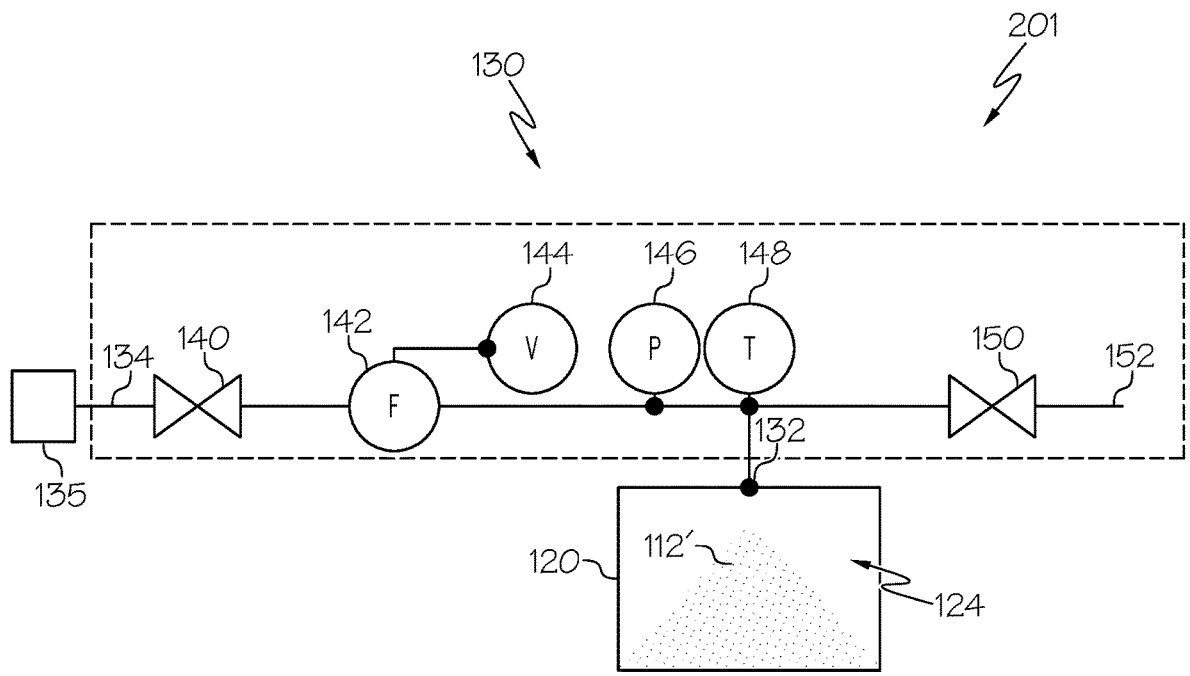
FIG. 3 schematically depicts the fill level of sensor of FIG. 1 without a reference chamber, according to one or more embodiments shown and described herein.

It is noted that in some embodiments, as illustrated in FIG. 3, the fill level sensor 130 may be provided without the reference chamber 136, reference chamber valve 137, and pressure sensor 138. In this regard, providing the fill level sensor 130 with the reference chamber 136, reference chamber valve 137, and pressure sensor 138 may be done when it is necessary to calibrate the fill level sensor 130 for determining unknown volumes. Without the reference chamber 136, the fill level is determined by scaling, where a lower pressure corresponds to a less full container and a high pressure (as previously determined by experiment) corresponds to a more full container, as discussed in further detail below.

The flow rate of the inert gas being delivered into the container interior 124 is measured by a gas flow meter 142. The gas flow meter 142 is fluidly connected to a volume meter 144 for measuring the volume of the inert gas being introduced into the container interior 124. The gas flow meter 142 and volume meter 144 ensure that the same amount of inert gas can be applied each time the fill level is measured. In this regard, a higher fill level corresponds to a higher pressure in the collection container 120, and a higher pressure in the collection container 120 results in lower flowrate of the inert gas from the constant pressure inert gas inlet 134. A second pressure transducer or sensor 146 is fluidly connected to the collection container 120 for measuring the pressure within the container interior 124. A temperature sensor 148 is further fluidly connected to the collection container 120 for measuring the temperature within the container interior 124. The fill level sensor 130 also includes an outlet valve 150 for regulating an output of the inert gas through an outlet 152.

Figure 4:
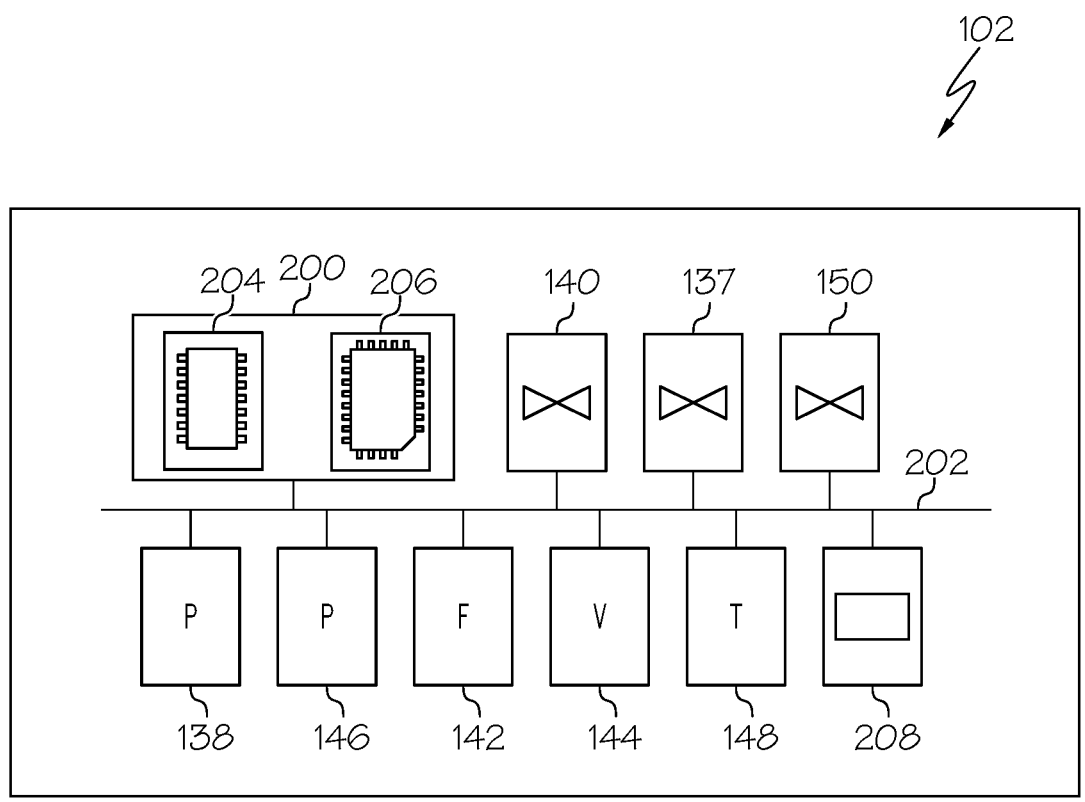
FIG. 4 schematically depicts various components of the particulate separation system of FIG. 1 in communication with an electronic control unit, according to one or more embodiments shown and described herein and FIG. 5 schematically depicts a flowchart for a method of determining the fill level of a material in a collection container, according to one or more embodiments shown and described herein.

As mentioned above, in accordance with some embodiments of the present disclosure, the fill level sensor 130 is generally adapted to determine, in a contactless manner, the fill level (e.g., volume) of the particulates 112' separated from the particulate-laden stream that have collected in the collection container 120. More particularly, the fill level sensor 130 operates by detecting the pressure change resulting from displacement of inert gas by the particulates 112' collected within the collection container 120. Based on the pressure change, the volume of the particulates 112' collected within the collection container 120 can be determined using the ideal gas law $PV=nRT$. In other embodiments, the fill level sensor 130 is generally adapted to determine, in a contactless manner, the fill level of material (e.g., build material/powder) in any container fluidly connected within the additive manufacturing apparatus 10. For example, the fill level sensor 130 may be fluidly connected to a supply receptacle which provides build material to the additive manufacturing apparatus 10 during the additive manufacturing process. In such embodiments, the fill level sensor 130 operates in a substantially similar manner. That is, the fill level sensor 130 detects the pressure change resulting from displacement of gas by the build material stored within the collection container 120. As described herein, it should be appreciated that the fill level sensor 130 may be operated to continuously detect pressure changes or, alternatively, operate at predetermined intervals, for example, 1 minute, 5 minutes, 10 minutes, 30 minutes, etc., to detect pressure changes within the collection container 120. In other embodiments, the fill level sensor 130 may be operated in response to receive a signal from an electronic control unit 200 (FIG. 4).

In embodiments where the reference chamber 136, reference chamber valve 137, and pressure sensor 138 are included (e.g., FIG. 2), in order to begin fill level sensing by the fill level sensor 130, the volume of the collection container 120 is sealed off. For example, the volume of collection container 120 may be sealed off from the volume of the filter device 102 by closing valves 116 and 122 (FIG. 1). The collected particulates 112' represent an unknown volume $V_x$ in the sealed collection container 120 having a known volume $V_s$. A pressure release through outlet 152 is performed by opening the outlet valve 150. The initial pressure ($P_s$) within the container interior 124 is measured using pressure transducer or sensor 146. The inert gas inlet 134 is then pressurized with the inert gas from an inert gas tank 135 to a fixed pressure $P_r$, which is greater than the pressure $P_s$ of the container interior 124. In some embodiments, the fixed pressure $P_r$ may be about 250 mbar. The reference chamber 136 has a known volume $V_r$, and during pressurizing at the inert gas inlet 134 to the fixed pressure $P_r$, the reference chamber valve 137 between the reference chamber 136 and the collection container 120 remains closed to isolate the volume $V_r$ of the reference chamber 136 from the volume $V_s$ of the collection container 120.

The inlet valve 140 is then opened for a fixed period to allow for fluid communication of the inert gas between the inert gas inlet 134 and the collection container 120. That is, the collection container 120 is pressurized by opening the valve 140. In some embodiments, the inlet valve 140 is opened for a period of about 2.5 seconds. Once the inlet valve 140 is opened, the pressure in the collection container 120 will rise. After the inlet valve 140 is shut, the reference chamber valve 137 is opened and the system (e.g., the reference chamber 136 and collection container 120) is allowed to equilibrate or reach a static state prior to measuring the pressure change or system pressure ($P_{sys}$) in the collection container 120 with the pressure transducer or sensor 146. In some embodiments, the period during which the system can equilibrate or reach the static state is about 30 seconds. The larger the volume of the collected particulates 112', the higher the final system pressure will be.

Having obtained the system pressure $P_{sys}$, the ideal gas law PV=nRT can be applied as follows to determine the volume $V_x$ of the collected particulates 112'. Ideally, the system is maintained at a constant temperature T, as measured by temperature sensor 148, and there is no net loss or gain of inert gas, that is, the number of inert gas molecules is constant during the pressure measurements taken as described above. The initial pressure of the reference chamber 136 is set as the upper limit when 100 percent of the volume of the collection container 120 is displaced by the unknown volume of the collected particulates 112'. Mathematically, this initial condition is represented by equation 1 below, where R is the gas constant:

$$Ps(Vs-Vx)+PrVr=nRT \quad (1).$$

After the inlet valve 140 is opened, the condition changes as shown in equation 2 below:

$$Psys(Vs+Vr-Vx)=nRT \quad (2).$$

This leads to the expression of equation 3 below:

$$Ps(Vs-Vx)+PrVr=Psys(Vs+Vr-Vx) \quad (3).$$

Equation 3 can be solved in terms of the unknown volume $V_x$ of the collected particulates 112' as shown in equation 4 below:

$$Vx = \frac{(P_{sys}V_s + P_{sys}V_r - P_s V_s - P_r V_r)}{(P_{sys} - P_s)}. \quad (4)$$

Alternatively, equation 5 below can be used to solve the unknown volume $V_x$ of the collected particulates 112':

$$V_x = V_s + \frac{V_r}{\left(1 - \dfrac{P_{initial}}{P_{end}}\right)}. \quad (5)$$

where $P_{initial}$ is the initial pressure in the collection container 120 and $P_{end}$ is the end pressure in the collection container 120 after equilibration.

In embodiments such as FIG. 3 where the fill level sensor 130 does not include the reference chamber 136, reference chamber valve 137, and pressure sensor 138, fill level sensing by the fill level sensor 130 is performed based on a pressure rise measured in the collection container 120. In order to determine fill level sensing based on a pressure rise in the collection container 120, one or more reference pressures in the collection container 120 are experimentally determined prior to fill level sensing during a build process of the additive manufacturing apparatus 10. A reference pressure may be determined prior to the build process by filling the collection container 120 to a known or desired fill level (e.g., 60%, 80%, etc.) with a material (e.g., particulates 112' or a build material/powder) whose volume is to be subsequently measured during the build process, and measuring the pressure in the collection container 120 at the known fill level to obtain the reference pressure for that material. The reference pressure is then compared to the pressure measured during the build process when the collection container 120 has an unknown volume of material and the fill level is obtained based on the comparison. For example, if a container is known to be full of material X and a reference pressure within the container is determined to be 100 mbar, a pressure of 50 mbar measured in the container during the build process corresponds to the container being 50% full of material X.

More particularly, once one or more reference pressures are experimentally determined, fill level sensing using the fill level sensor 130 without the reference chamber 136, reference chamber valve 137, and pressure sensor 138, begins by sealing off the volume of the collection container 120. The collected particulates 112' (or other material) represent an unknown volume $V_x$ in the sealed collection container 120 having a known volume $V_s$. A pressure release is performed by opening the outlet valve 150. The initial pressure ($P_s$) within the container interior 124 is measured using pressure transducer or sensor 146. The inert gas inlet 134 then pressurized to a fixed pressure $P_r$, which is greater than the pressure $P_s$ of the container interior 124. In some embodiments, the fixed pressure $P_r$ may be about 250 mbar.

The valve 140 is then opened for a fixed period to allow for fluid communication of the inert gas between the inert gas inlet 134 and the collection container 120. That is, the collection container 120 is pressurized by opening the valve 140. In some embodiments, the valve 140 is opened for a period of about 2.5 seconds. Once the valve 140 is opened, the pressure in the collection container 120 will rise. After the valve 140 is shut, the collection container 120 is allowed to equilibrate or reach a static state prior to measuring the pressure change or system pressure ($P_{sys}$) in the collection container 120 with the pressure transducer or sensor 146. In some embodiments, the period during which the system can equilibrate or reach the static state is about 30 seconds. The larger the volume of the collected particulates 112', the higher the final system pressure will be.

Having obtained the system pressure $P_{sys}$, the system pressure $P_{sys}$ can be compared to the previously determined reference pressure to determine the fill level of the collection container 120 as described above. The specific volume $V_x$ of the collected particulates 112' can be determined using the ideal gas law PV=nRT to determine the volume $V_x$ of the collected particulates 112'. Ideally, the system is maintained at a constant temperature T, as measured by temperature sensor 148, and there is no net loss or gain of inert gas, that is, the number of inert gas molecules is constant during the pressure measurements taken as described above.

After the volume $V_x$ of the collected particulates 112' is determined, whether using the reference chamber 136 or not, the inert gas within the fill level sensor 130 and the collection container 120 can be evacuated by opening an outlet valve 150 such that the inert gas can exit outlet 152. In some embodiments, the inert gas exiting the outlet 152 can be recirculated within the filter device 102 of the powder or particulate separation system 100.

Having obtained the volume of the particulates 112' collected within the collection container, a fill level percentage can be obtained by comparing the particulate volume to the known volume of the collection container. Alternatively, the fill level percentage can correspond to the system pressure measured by the pressure transducer or sensor 146, where a higher system pressure corresponds to a greater fill level percentage. In some embodiments, having determined the fill level percentage, the decision to empty and replace the collection container 120, or alternatively select a different, empty collection container for connection to the filter device 102 can be made. This decision may be made when the fill level percentage of the collection container 120 reaches a certain threshold.

For example, in some embodiments, it may be desirable to empty the collection container 120 at a fill level percentage of about 60%-80% to account for any inaccuracy in the measurements of the fill level sensor 130. In this regard, the fill level sensor 130 may be configured to provide an alert once the collected particulate 112' approaches or reaches the threshold fill level percentage level in the collection container 120. For example, the fill level sensor 130 may provide an auditory and/or visual alert, such as an alarm and/or warning light.

Referring now to FIG. 4, components of the particulate separation system 100 are schematically depicted. The particulate separation system 100 includes an electronic control unit 200, a communication path 202, the inlet valve 140, the reference chamber valve 137, the outlet valve 150, the pressure sensor 138, the pressure transducer 146, the gas flow meter 142, the volume meter 144, and the temperature sensor 148.

As noted above, the particulate separation system 100 includes the communication path 202. The communication path 202 may be formed from any medium that is capable of transmitting a signal such as, for example, conductive wires, conductive traces, optical waveguides, or the like. Moreover, the communication path 202 may be formed from a combination of mediums capable of transmitting signals. In one embodiment, the communication path 202 includes a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 202 communicatively couples the various components of the particulate separation system 100. As used herein, the term "communicatively coupled" means that coupled components are capable of exchanging data signals with one another such as, for example, electrical signals via conductive medium, electromagnetic signals via air, optical signals via optical waveguides, and the like.

As noted above, the particulate separation system 100 includes the electronic control unit 200 including one or more processors 204 and one or more memory modules 206. Each of the one or more processors 204 may be any device capable of executing machine readable instructions. Accordingly, each of the one or more processors 204 may be an integrated circuit, a microchip, a computer, or any other computing device. The one or more processors 204 are communicatively coupled to the other components of the particulate separation system 100 by the communication path 202. Accordingly, the communication path 202 may communicatively couple any number of processors with one another, and allow the modules coupled to the communication path 202 to operate in a distributed computing environment. Specifically, each of the modules may operate as a node that may send and/or receive data.

Each of the one or more memory modules 206 of the particulate separation system 100 is coupled to the communication path 202 and communicatively coupled to the one or more processors 204. The one or more memory modules 206 may include RAM, ROM, flash memories, hard drives, or any device capable of storing machine readable instructions such that the machine readable instructions may be accessed and executed by the one or more processors 202. The machine readable instructions may include logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 206. In some embodiments, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

In embodiments, the particulate separation system 100 includes a user interface 208. The user interface 208 may include one or more of a display screen and a speaker such that the user interface 208 may provide audio and/or visual feedback regarding operation of the particulate separation system 100. The user interface 208 may further include one or more user input devices such as, for example, buttons, knobs, and the like, such that a user may provide instructions to the various components of the particulate separation system 100 via the user interface 208. Accordingly, The electronic control unit 200 is communicatively coupled to the other components of the particulate separation system 100. As such, the electronic control unit 200 is configured to receive signals from various components of the particulate separation system 100 and, in response, appropriately control operation of the particulate separation system 100 via the other components. Various operations of the above components during operation are described in more detail herein.

Figure 5:
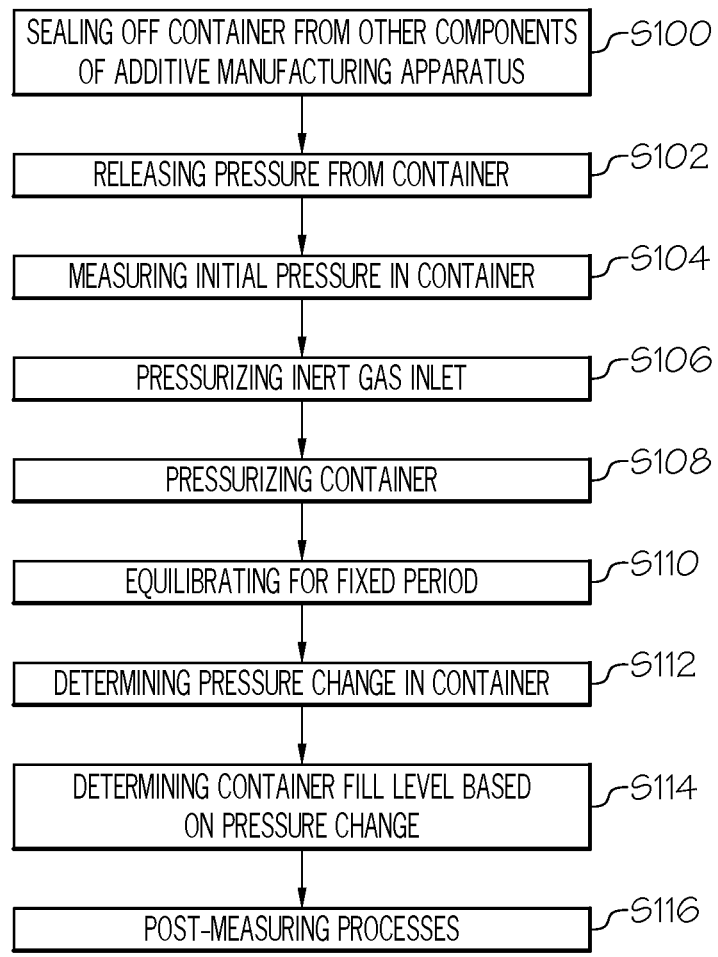

Referring now to FIG. 5, and with reference to FIGS. 1-4 discussed herein, a method is disclosed for determining a fill level of material in a container (e.g., collection container 120 discussed above) of an additive manufacturing apparatus 10.

The method may generally begin at S100 when it is desired to check the fill level of the collection container 120. As described herein, the fill level sensor 130 may be operated to continuously detect pressure changes or, alternatively, operate at predetermined intervals, for example, 1 minute, 5 minutes, 10 minutes, 30 minutes, etc., to detect pressure changes within the collection container 120. In other embodiments, the fill level sensor 130 may be operated in response to receive a signal from an electronic control unit 200. In this regard, prior to performing S100, it is generally assumed that the collection container 120 has been at least partially filled with some material (e.g., particulates, build material, etc.) associated with the build process of the additive manufacturing apparatus 10. Moreover, for embodiments of the fill level sensor 130 without the reference chamber 136, it is generally assumed that the one or more reference pressures described above have been experimentally determined prior to performing S100. That is, one or more reference pressures are experimentally determined by filling the collection container 120 to a known or desired fill level with a material whose volume is to be subsequently measured during the build process, and measuring the pressure in the collection container 120 at the known fill level to obtain the reference pressure for that material. These reference pressures may be stored within the one or more memory modules 206 of the electronic control unit 200. S100 is then directed to sealing off, in response to receiving a signal from the electronic control unit 200, the collection container 120 from other components of the additive manufacturing apparatus 10 such that the only measurements being taken are with respect to the volume of the collection container 120.

Next, S102 is directed to the releasing of pressure from the collection container 120. In particular, pressure is released through the outlet 152 in response to the electronic control unit 200 receiving an activation signal, such as from the user interface 208, and transmitting a signal to the outlet valve 150 to close the outlet valve 150. Subsequently, the electronic control unit 200 transmits a signal to the outlet valve 150 to be closed prior to performing S104. Once the pressure release is finished, S104 is directed to measuring the initial pressure in the collection container 120. In particular, the pressure sensor 146 is used to measure the initial pressure. The measured pressure is transmitted from the pressure sensor 146 to the electronic control unit 200. Then, S106 is directed to pressurizing the inert gas inlet 134. In some embodiments, a fixed pressure of about 250 mbar is generated at the inert gas inlet 134.

The method continues at S108, which is directed to the pressurizing of the collection container 120. In particular, the electronic control unit 200 transmits a signal to the inlet valve 140, which is located between the inlet 134 and the collection container 120, to opened the inlet valve 140 to allow for fluid communication of the inert gas between the inlet 134 of the fill level sensor 130 and the collection container 120. That is, the inlet valve 140 is opened for a fixed period of time to allow pressure to rise in the collection container 120. In some embodiments, the inlet valve 140 is opened for a period of about 2.5 seconds. Once the inlet valve 140 is opened, the flow rate of the inert gas can be measured by the gas flow meter 142, and the volume of the inert gas being delivered to the collection container 120 can be measured by the volume meter 144.

Next, S110 is directed to equilibrating the collection container 120 for a fixed period. In some embodiments, the fixed period for equilibration is about 30 seconds. In addition, in some embodiments where the fill level sensor 130 includes reference chamber 136 as described above, S110 is also directed to the electronic control unit 200 instructing the reference chamber valve 137 to be opened such that equilibration can also occur in the reference chamber 136.

The method continues at S112 which is directed to determining the pressure change in the collection container 120 after equilibration. In particular, the end pressure or pressure change is measured in the collection container 120 with the pressure sensor 146, which is then transmitted to the electronic control unit 200. Additionally, the temperature within the collection container 120 may be measured using temperature sensor 148, which is also transmitted to the electronic control unit 200 configured to determine the pressure change in the collection container 120 after equilibration. Then, S114 is directed to determining the fill level of the collection container 120 based on the pressure change determined at S112. In embodiments of the fill level sensor 130 where the reference chamber 136 is included, the fill level of the collection container 120 may be determined by the electronic control unit 200 solving equation 4 or 5 for the unknown volume of material $V_x$ within the container. The fill level percentage may then be obtained by the electronic control unit 200 comparing the volume of material $V_x$ to the known volume $V_s$ of the collection container 120. In embodiments where the fill level sensor 130 does not include the reference chamber 136, the fill level of the collection container 120 may be determined by the electronic control unit 200 comparing the pressure measured at S112 to the reference pressure previously determined experimentally as described above.

Once the fill level or, more specifically, the fill level percentage, is determined by the electronic control unit 200, the electronic control unit 200 transmits the data to the user interface 208 such that a user or operator may be notified of the fill level of the collection container 120. In embodiments, the user interface 208 continuously displays the fill level. In other embodiments, the user interface 208 only displays the fill level if the electronic control unit 200 determines that the fill level exceeds a threshold fill level percentage level. In instances in which the fill level exceeds the threshold fill level percentage level, the user interface 208 may initiate an alarm event in which an audio and/or visual alarm is provided to notify a user or operator that the collection container 120 should be emptied.

Next, the method ends with one or more post-measuring processes at S116. For example, S116 may be directed to evacuating the inert gas within the fill level sensor 130 and the collection container 120. In particular, outlet valve 150 is opened in response to receiving a signal from the electronic control unit 200 to release the inert gas from the outlet 152. In some embodiments, S116 may also be directed to recirculating the evacuated inert gas within the additive manufacturing apparatus 10, such as within the filter device 102 of the powder or particulate separation system 100, for example. In some embodiments, S116 may be directed to emptying or refilling the material in the collection container 120 based on the fill level determined at S114.

From the above, it is to be appreciated that defined herein is a particulate separation system which includes a fluidly connected particulate collection container and fill level sensor. The fill level sensor utilizes the ideal gas law to calculate the powder or particulate volume in the container, which has a known volume, when filled with a known amount of gas by measuring the pressure change and gas temperature. In this regard, a fill level percentage can be determined based on the calculated volume, and the fill level percentage can inform a decision to empty and/or replace the container such that further powder/particulate matter can be collected.

Further aspects of the embodiments described herein are provided by the subject matter of the following clauses:

A particulate separation system comprising: a filter device that separates particulates from a particulate-laden stream generated by an additive manufacturing apparatus; a collection container fluidly connected to the filter device that receives the particulates separated from the particulate-laden stream; and a fill level sensor fluidly connected to the collection container that detects a pressure change from displacement of an inert gas by the particulates received in the collection container, the pressure change utilized to detect a fill level of particulates within the collection container.

The particulate separation system of any preceding clause, wherein the fill level sensor further comprises a reference chamber including a pressure sensor fluidly connected to the collection container.

The particulate separation system of any preceding clause, wherein the fill level sensor further comprises: a temperature sensor fluidly connected to the collection container, the temperature sensor configured to detect a temperature within the collection container, the detected temperature utilized to determine the pressure change.

The particulate separation system of any preceding clause, wherein the fill level sensor further comprises a gas flow meter fluidly connected to the collection container.

The particulate separation system of any preceding clause, wherein a gas volume meter is fluidly connected to the gas flow meter.

The particulate separation system of any preceding clause, wherein the fill level sensor further comprises an inlet that provides the inert gas and a reference chamber disposed between the inlet and the collection container.

The particulate separation system of any preceding clause, further comprising a valve disposed between the reference chamber and the collection container, the valve regulates a flow of the inert gas between the reference chamber and the collection container.

The particulate separation system of any preceding clause, wherein the collection container includes a body and a neck provided at an upper surface of the body, the neck having a diameter less than a diameter of the body.

The particulate separation system of any preceding clause, wherein the fill level sensor is fluidly connected to the collection container at an inlet connection, the inlet connection extending through the neck of the collection container.

The particulate separation system of any preceding clause, further comprising: an inlet valve for controlling a flow of the particulates from the additive manufacturing apparatus; a reference chamber located downstream of the inlet valve; and a reference chamber valve located between the inlet valve and the reference chamber for controlling a flow of the particulates into the reference chamber.

The particulate separation system of any preceding clause, further comprising: a user interface; and an electronic control unit communicatively coupled to the fill level sensor and the user interface, the electronic control unit configured to transmit a signal to the user interface to display a determined fill level percentage within the collection container.

The particulate separation system of any preceding clause, wherein the electronic control unit is configured to transmit a signal to the user interface to display a determined fill level percentage within the collection container when the determined fill level percentage exceeds a threshold fill level percentage level.

The particulate separation system of any preceding clause, wherein the user interface initiates an alarm event in which an audio and/or visual alarm is provided when the determined fill level percentage exceeds the threshold fill level percentage level.

An apparatus comprising: a collection container having a container interior that receives material used in an additive manufacturing apparatus; and a fill level sensor fluidly connected to the container interior that detects a pressure change from displacement of an inert gas by the material received in the container interior.

The apparatus of any preceding clause, wherein the fill level sensor further comprises a pressure sensor fluidly connected to the container interior.

The apparatus of any preceding clause, wherein the fill level sensor further comprises a temperature sensor fluidly connected to the container interior.

The apparatus of any preceding clause, wherein the collection container includes a body and a neck provided at an upper surface of the body, the neck having a diameter less than a diameter of the body.

The apparatus of any preceding clause, wherein the fill level sensor is fluidly connected to the collection container at an inlet connection, the inlet connection extending through the neck of the collection container.

The apparatus of any preceding clause, further comprising: a user interface; and an electronic control unit communicatively coupled to the fill level sensor and the user interface, the electronic control unit configured to transmit a signal to the user interface to display a determined fill level percentage within the collection container.

The apparatus of any preceding clause, wherein the fill level sensor further comprises: an inlet valve for controlling a flow of particulates from the additive manufacturing apparatus; a reference chamber located downstream of the inlet valve; and a reference chamber valve located between the inlet valve and the reference chamber for controlling a flow of the particulates into the reference chamber.

A method of determining a fill level of material in a collection container of an additive manufacturing apparatus, comprising: detecting a pressure change from displacement of an inert gas by the material in the collection container with a fill level sensor; and determining the fill level of the material in the collection container based on the pressure change.

The method of any preceding clause, further comprising sealing off the collection container.

The method of any preceding clause, further comprising measuring a pressure within the collection container using a pressure sensor.

The method of any preceding clause, further comprising pressurizing an inlet of the fill level sensor with the inert gas to a fixed pressure, wherein the fixed pressure is greater than the pressure within the collection container.

The method of any preceding clause, further comprising opening a valve disposed between the inlet of the fill level sensor and the collection container to allow for fluid communication of the inert gas between the inlet of the fill level sensor and the collection container.

The method of any preceding clause, further comprising evacuating the inert gas from the fill level sensor and the collection container via an outlet of the fill level sensor.

The method of any preceding clause, further comprising recirculating the inert gas evacuated from the fill level sensor and the collection container into the additive manufacturing apparatus.

The method of any preceding clause, further comprising emptying or refilling the material from the collection container based on the fill level.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. A particulate separation system, comprising:
    a filter device that separates particulates from a particulate-laden stream generated by an additive manufacturing apparatus;
    a collection container fluidly connected to the filter device that receives the particulates separated from the particulate-laden stream; and
    a fill level sensor fluidly connected to the collection container that detects a pressure change from displacement of an inert gas by the particulates received in the collection container, the pressure change utilized to detect a fill level of particulates within the collection container, wherein the fill level sensor comprises:
        an inlet valve to control a flow of the inert gas from an inert gas tank to the collection container;
        a reference chamber located downstream of the inlet valve;
        an outlet valve to control venting of the collection container and the reference chamber to an ambient environment; and
        a reference chamber valve located between the inlet valve and the reference chamber to control a flow of the inert gas from the inert gas tank to the reference chamber; and
    an electronic control unit including a processor and a memory module operatively connected to elements of the fill level sensor, the electronic control unit being configured to detect the fill level of particulates within the collection container by:
        opening the outlet valve to release pressure from within the collection container;
        closing the outlet valve and measuring an initial pressure within the collection container;
        opening the inlet valve for a first period of time to pressurize the collection container with the inert gas from the inert gas tank;
        closing the inlet valve and opening the reference chamber valve for a second period of time to allow pressure within the collection container and the reference chamber to equilibrate; and
        measuring an end pressure within the collection container after equilibration, the reference chamber valve remaining open during measurement of the end pressure,
    wherein the initial pressure and the end pressure within the collection container determine the pressure change that is then utilized to detect a fill level of particulates within the collection container.

2. The particulate separation system of claim 1, wherein the fill level sensor further comprises a pressure sensor fluidly connected to the collection container, and a second pressure sensor fluidly coupled to the reference chamber.

3. The particulate separation system of claim 1, wherein the fill level sensor further comprises:
    a temperature sensor fluidly connected to the collection container, the temperature sensor configured to detect a temperature within the collection container, the detected temperature utilized to determine the pressure change.

4. The particulate separation system of claim 1, wherein the fill level sensor further comprises a gas flow meter fluidly connected to the collection container.

5. The particulate separation system of claim 4, wherein a gas volume meter is fluidly connected to the gas flow meter.

6. The particulate separation system of claim 4, wherein the gas flow meter is located downstream of each of the inlet valve and the reference chamber valve.

7. The particulate separation system of claim 1, wherein the collection container includes a body and a neck provided at an upper surface of the body, the neck having a diameter less than a diameter of the body.

8. The particulate separation system of claim 7, wherein the fill level sensor is fluidly connected to the collection container at an inlet connection, the inlet connection extending through the neck of the collection container.

9. The particulate separation system of claim 1, further comprising:
    a user interface,
    wherein the electronic control unit is communicatively coupled to the fill level sensor and the user interface, the electronic control unit configured to transmit a signal to the user interface to display a determined fill level percentage within the collection container.

10. The particulate separation system of claim 9, wherein the electronic control unit is configured to transmit a signal to the user interface to display a determined fill level percentage within the collection container when the determined fill level percentage exceeds a threshold fill level percentage level.

11. The particulate separation system of claim 10, wherein the user interface initiates an alarm event in which an audio and/or visual alarm is provided when the determined fill level percentage exceeds the threshold fill level percentage level.

12. The particulate separation system of claim 1, the reference chamber valve also being located between the collection container and the reference chamber to thereby control communication between volumes of the collection container and the reference chamber, wherein the volumes of the collection container and the reference chamber and a temperature within the fill level sensor remain known constants during measurements of pressures within the collection container, such that variations in the pressure change detected are caused only by variations in the fill level of particulates within the collection container.

13. An apparatus comprising:
a collection container having a container interior that receives material used in an additive manufacturing apparatus; and
a fill level sensor fluidly connected to the container interior that detects a pressure change from displacement of an inert gas by the material received in the container interior, the fill level sensor comprises:
   an inlet valve to control a flow of the inert gas from an inert gas tank to the collection container;
   a reference chamber located downstream of the inlet valve;
   an outlet valve to control venting of the collection container and the reference chamber to an ambient environment; and
   a reference chamber valve located between the inlet valve and the reference chamber to control a flow of the inert gas from the inert gas tank to the reference chamber; and
an electronic control unit including a processor and a memory module operatively connected to elements of the fill level sensor, the electronic control unit being configured to detect the fill level of particulates within the collection container by:
   opening the outlet valve to release pressure from within the collection container;
   closing the outlet valve and measuring an initial pressure within the collection container;
   opening the inlet valve for a first period of time to pressurize the collection container with the inert gas from the inert gas tank;
   closing the inlet valve and opening the reference chamber valve for a second period of time to allow pressure within the collection container and the reference chamber to equilibrate; and
   measuring an end pressure within the collection container after equilibration, the reference chamber valve remaining open during measurement of the end pressure,
wherein the initial pressure and the end pressure within the collection container determine the pressure change that is then utilized to detect a fill level of particulates within the collection container.

14. The apparatus of claim 13, wherein the fill level sensor further comprises a pressure sensor fluidly connected to the container interior, and a second pressure sensor fluidly coupled to the reference chamber.

15. The apparatus of claim 13, wherein the fill level sensor further comprises a temperature sensor fluidly connected to the container interior.

16. The apparatus of claim 13, wherein the collection container includes a body and a neck provided at an upper surface of the body, the neck having a diameter less than a diameter of the body.

17. The apparatus of claim 16, wherein the fill level sensor is fluidly connected to the collection container at an inlet connection, the inlet connection extending through the neck of the collection container.

18. The apparatus of claim 13, further comprising:
a user interface,
wherein the electronic control unit is communicatively coupled to the fill level sensor and the user interface, the electronic control unit configured to transmit a signal to the user interface to display a determined fill level percentage within the collection container.

19. The apparatus of claim 13, further comprising a gas flow meter located downstream of each of the inlet valve and the reference chamber valve.

20. The apparatus of claim 13, the reference chamber valve also being located between the collection container and the reference chamber to thereby control communication between volumes of the collection container and the reference chamber, wherein the volumes of the collection container and the reference chamber and a temperature within the fill level sensor remain known constants during measurements of pressures within the collection container, such that variations in the pressure change detected are caused only by variations in the fill level of particulates within the collection container.

* * * * *